US010604256B2

(12) United States Patent
Gad

(10) Patent No.: US 10,604,256 B2
(45) Date of Patent: Mar. 31, 2020

(54) SYSTEM AND METHOD FOR DETACHING AN EXTRACTION UNIT FROM AN EXTRACTABLE UNIT

(71) Applicant: Airbus Operations GmbH, Hamburg (DE)

(72) Inventor: Roland Gad, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 464 days.

(21) Appl. No.: 15/159,016

(22) Filed: May 19, 2016

(65) Prior Publication Data
US 2016/0340036 A1   Nov. 24, 2016

(30) Foreign Application Priority Data

May 20, 2015   (EP) .................................... 15168535

(51) Int. Cl.
B64D 1/12       (2006.01)
B64D 17/38      (2006.01)
B64D 17/62      (2006.01)

(52) U.S. Cl.
CPC ............... B64D 1/12 (2013.01); B64D 17/38 (2013.01); B64D 17/62 (2013.01)

(58) Field of Classification Search
CPC ........... B64D 1/12; B64D 17/62; B64D 17/38
See application file for complete search history.

(56) References Cited

U.S. PATENT DOCUMENTS

| 3,396,924 | A |   | 8/1968 | Kriesel |             |
|-----------|---|---|--------|---------|-------------|
| 3,670,999 | A | * | 6/1972 | Leger   | B64D 1/10   |
|           |   |   |        |         | 244/137.3   |
| 3,678,999 | A |   | 7/1972 | Kulikov et al. |       |
| 3,724,788 | A | * | 4/1973 | Petry   | B64D 1/02   |
|           |   |   |        |         | 244/137.3   |

(Continued)

FOREIGN PATENT DOCUMENTS

DE   10 2010 05089   5/2012

OTHER PUBLICATIONS

Communication from the European Patent Office enclosing Extended European Search Report for Application No. 15 16 8535 dated Nov. 11, 2015.

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

A system and method for detaching an extractable unit from an extraction unit pulling the extractable unit in an extraction direction out of a cargo bay of an aerospace vehicle for aerial delivery. The system includes a detachment unit which is connectable to an extractable unit and which is operable for controllably detaching an extraction unit from the extractable unit, a guiding system and a release unit. The release unit is movably attached to the guiding system and physically connected to the detachment unit such that the release unit is movable with an extractable unit to which the detachment unit has been connected in the extraction direction along the guiding system. The release unit is controllable to operate the detachment unit to which the release unit is connected for detaching an extraction unit from the extractable unit.

19 Claims, 1 Drawing Sheet

(56) References Cited

U.S. PATENT DOCUMENTS

| | | | |
|---|---|---|---|
| 4,337,913 A | 7/1982 | Booth | |
| 5,816,535 A | 10/1998 | Underwood, Jr. et al. | |
| 2004/0050343 A1* | 3/2004 | Kurtgis | B64D 1/12 |
| | | | 119/710 |
| 2010/0001140 A1* | 1/2010 | McHugh | B64D 17/30 |
| | | | 244/148 |
| 2012/0291234 A1* | 11/2012 | Berge | B64D 17/46 |
| | | | 24/323 |
| 2013/0175399 A1* | 7/2013 | Fitzgerald | B64D 17/32 |
| | | | 244/151 B |
| 2014/0084111 A1 | 3/2014 | Bohlen et al. | |
| 2014/0097299 A1* | 4/2014 | Deazley | B64D 1/08 |
| | | | 244/149 |
| 2017/0088262 A1* | 3/2017 | Brown | B64D 1/22 |

* cited by examiner

SYSTEM AND METHOD FOR DETACHING AN EXTRACTION UNIT FROM AN EXTRACTABLE UNIT

CROSS-REFERENCE TO RELATED APPLICATION

This application claims priority to European Patent Application No. 15168535.1 filed May 20, 2015, the entire disclosure of which is incorporated by reference herein.

TECHNICAL FIELD

The present disclosure relates to a system for detaching an extraction unit from an extractable unit in aerial delivery, wherein the extraction unit is adapted to pull the extractable unit in an extraction direction through and/or out of a cargo bay of an aerospace vehicle for aerial delivery. The system comprises a detachment unit which is connectable to an extractable unit and which is operable for controllably detaching an extraction unit from the extractable unit. Further, the present disclosure relates to a method for detaching an extraction unit from an extractable unit.

BACKGROUND

Aerial delivery of cargo units, i.e. dropping of cargo from a flying aircraft, by parachutes is one way of providing supply in areas that are cut-off from ground supply and lack landing areas for aircraft. Contrary to what is implied by the term "drop", cargo units have to be pulled out of the aircraft, i.e. extracted from the aircraft, with the correct extraction velocity to ensure that the cargo units will leave the cargo bay of the aircraft in a defined manner. To generate a sufficiently high extraction velocity, cargo units are pulled out of the cargo bay of the aircraft by an extraction parachute.

While the cargo units are pulled out of the cargo bay they may get jammed, i.e., the cargo units are stuck and cannot move further. In this case the extraction parachute has to be disconnected or detached from the cargo unit. To this end present aerial delivery systems employ a pyrotechnic mechanism which is arranged at the interface between the extraction parachute and the cargo unit. When the cargo unit has not yet moved from its initial position or has not been pulled further away than approximately 0.5 m, a cargo operator or loadmaster can activate the pyrotechnic mechanism from his workstation. Thereby, an explosive charge is set off detaching the extraction parachute from the cargo unit.

If the cargo unit has already moved more than approximately 0.5 m away from its initial position when the cargo unit jams, the pyrotechnic mechanism cannot be activated anymore. For detaching the extraction parachute from the cargo unit the loadmaster has to manually cut the connection between the extraction parachute and the cargo unit. Thus, the loadmaster has to leave his workstation and move through the open cargo bay to the jammed cargo unit which may take considerable time keeping in mind that the cargo door and/or cargo ramp of the cargo bay is open and the size of today's cargo aircraft.

SUMMARY

It is, therefore, an object of the present disclosure to provide an enhanced aerial delivery system which enables an operator to controllably detach an extraction parachute from a jammed cargo unit even if the cargo unit has moved more than 0.5 m away from its initial position without having to manually cut a connection.

In a first aspect the problem is solved by a system for detaching an extraction unit from an extractable unit further comprising a guiding system and a release unit. The release unit is movably attached to the guiding system and physically connected to the detachment unit such that the release unit is movable with an extractable unit to which the detachment unit has been connected in the extraction direction along the guiding system when the extractable unit is pulled by an extraction unit through and/or out of a cargo bay of an aerospace vehicle. The release unit is controllable to operate the detachment unit to which the release unit is connected for detaching an extraction unit from the extractable unit to which the detachment unit has been connected.

The system according to the present disclosure is provided for detaching an extraction unit from an extractable unit in aerial delivery. An extraction unit can, for example, be an extraction parachute or a drogue parachute. However, if a plurality of extraction units are extracted or dropped from an aerospace vehicle, the extraction unit pulling the extractable unit out of the cargo bay can also be formed by a preceding cargo unit. An extractable unit can, for example, be a unit load device (ULD) such as a 463 L compatible ULD, a vehicle or other kinds of the cargo units. The system according to the present disclosure can, for example, be used to drop cargo from an aerospace vehicle in form of a military cargo aircraft.

The system comprises a detachment unit, a release unit and a guiding system. The detachment unit is connected to and preferably arranged at the extractable unit at the interface between the extractable unit and the extraction unit. A detachment unit can, for example, be formed by a pyrotechnic mechanism comprising an explosive charge which can be set off to disconnect the extractable unit from the extraction unit. However, in a preferred embodiment the attachment unit is a three-ring release system such as the system known from U.S. patent no. c. The three-ring release system is provided for connecting the extraction unit with the extractable unit and comprises a release element. If the release element is pulled to a release position, the three-ring release system opens and detaches or disconnects the extractable unit from the extraction unit. Advantageously, the release element of a three-ring release system can be easily pulled even if high loads are transmitted from the extraction unit to the extractable unit. Further, contrary to a pyrotechnic mechanism a three-ring release system can be reused multiple times.

The guiding system can, for example, be formed by a rail arrangement. It is, however, also conceivable that the guiding system is formed by a wire. The guiding system is provided such that the release unit can move along the guiding system in the extraction direction with an extractable unit which is being pulled out of the cargo bay of the aerospace vehicle. In other words, the guiding system is adapted to guide the release unit in a guiding direction through the cargo bay of an aerospace vehicle, wherein the guiding direction extends parallel to the extraction direction. In an exemplary, preferred embodiment the extraction direction and the guiding direction extend parallel to a longitudinal direction of an aerospace vehicle when the system is mounted in the cargo bay of the aerospace vehicle.

The release unit is arranged on the guiding system such that it is movable along the guiding system, for example, by sliding along a rail or a wire which is part of the guiding system. The movement can be induced by the physical connection or link between the release unit and the detachment unit. In other words, if the detachment unit moves with an extractable unit being pulled out of a cargo bay, the release unit is pulled along through the physical connection. In other exemplary embodiments the release unit is self-propelled or driven by the guiding system to move along with an extractable unit.

If an extractable unit which is being pulled out of the cargo bay of an aircraft by an extraction unit is jammed or gets stuck while being pulled through the cargo bay, the release unit can be controlled to operate the detachment unit to detach the extraction unit from the extractable unit. For example, a loadmaster can send a signal from his workstation to the release unit upon reception of which signal the release unit operates the detachment unit. As the release unit can move along the guiding system through the entire cargo bay with an extractable unit, a remote-controlled or even automated detachment of the extraction unit from the extractable unit is still possible even after the extractable unit has left its initial position.

In a preferred embodiment the release unit is adapted to operate the detachment unit when the extractable unit to which the detachment unit has been connected has been pulled out of a cargo bay of an aerospace vehicle by an extraction unit. In other words, the release unit advantageously automatically detaches the extraction unit from the extractable unit once the pull out of the cargo bay of an aerospace vehicle has been completed. This is particularly advantageous if the extraction unit is itself also an extractable unit, e.g., a cargo unit as it is ensured that the extractable units are separated from one another during the drop and the parachutes slowing down the dropping extractable units can inflate independently for each extractable unit.

It is further preferred that the release unit is physically connected by a release line or release leash to the detachment unit. The detachment unit is adapted to only detach the extraction unit from the extractable unit if a load acting through the release line onto the detachment unit exceeds a predetermined value. Thus, it is advantageously ensured that the detachment unit only detaches the extraction unit from the extractable unit if a detachment is intended and not, for example, already if the release element accelerates somewhat slower than the extractable unit to which the detachment unit is connected.

The release unit preferably comprises an actuator which is adapted to tighten the release line until the load acting onto the detachment unit through the release line exceeds the predetermined value for detaching the extraction unit from the extractable unit. The actuator can, for example, be a hydraulic motor, an electric motor, a pneumatic motor or a motor driven by a loaded spring. Thus, when the release unit is controlled to operate the detachment unit, the actuator is activated and tightens or pulls the release line to increase the load onto the detachment unit until it exceeds the predetermined value and the extraction unit is detached from the extractable unit.

It is preferred that the release line is adapted to transfer a load from the detachment unit to the release unit such that when the extractable unit to which the detachment unit has been connected is pulled in the extraction direction by an extraction unit the release unit moves with the extractable unit along the guiding system in the extraction direction. Thus, the release line not only transmits the detachment command to the detachment unit but also makes sure that the release unit moves along the guiding system with the extractable unit. Hence, the release unit does not have to be self-propelled or propelled by the guiding system and it is ensured that the release unit moves parallel to the extractable unit to which the detachment unit has been connected.

In an alternative exemplary embodiment in which the release unit is self-propelled or propelled by the guiding system, it may not be necessary to provide an actuator for tightening the release line as the release unit will continue to move if the extractable unit is jammed or is stuck while being pulled through the cargo bay. Thus, the release line will automatically be tightened by the continued movement of the release unit until the load acting onto the detachment unit from the release line exceeds the predetermined load.

In an embodiment in which the release unit is adapted to operate the detachment unit when the extractable unit to which the detachment unit has been attached has been pulled out of a cargo bay, the detachment unit is preferably operated by the release unit in that further movement of the release unit along the extraction direction is prevented by the guiding system such that the load acting onto the detachment unit through the release line exceeds the predetermined value due to a continued movement of the extractable unit. In other words, the guiding system comprises a stopping element which restricts the maximum movement of the release unit in the extraction direction. If the release unit engages with the stop element and the physically connected detachment unit continues to move with an extractable unit, the release line is tightened until the detachment unit detaches the extraction unit from the extractable unit. Thus, the extraction unit is automatically detached from the extractable unit once the unit has been pulled out of the cargo bay of the aerospace vehicle.

In a further preferred embodiment the guiding system is adapted to be mounted in a cargo bay of the vehicle such that an extractable unit moving along a floor of the cargo bay in the extraction direction moves between the floor of the cargo bay and the guiding system. The guiding system can, for example, be mounted to the ceiling of the cargo bay to make sure that the release unit and, for example, the release line connecting the release unit to the detachment unit can move freely through the cargo bay with the extractable units and does, for example, not jam between an extractable unit and the floor of the cargo bay.

In the preceding preferred embodiments of the disclosure herein the system comprises only one release unit and only one detachment unit. The system can, however, in an exemplary embodiment also be used with a plurality of release units and a plurality of detachment units using the same guiding system, wherein each release unit is connected to one detachment unit and controls the operation of the detachment unit. The different embodiments of the release unit and the detachment unit can likewise be applied if a plurality of release units and detachment units are used. Using a plurality of detachment units and release units advantageously allows dropping a plurality of extractable units from an aerospace vehicle wherein for each of the extractable units a detachment of the extraction unit is possible if the extractable unit should be jammed during the drop.

In a second aspect the problem is solved by a method for detaching an extraction unit from an extractable unit when the extraction unit pulls the extractable unit in an extraction direction through and/or out of the cargo bay of an aerospace vehicle for aerial delivery. The extractable unit is connected to the extraction unit by a detachment unit. A release unit physically connected to the detachment unit moves along a guiding system in the extraction direction with the extractable unit when the extractable unit is pulled by an extraction unit through and/or out of the cargo bay, wherein the release unit is controlled to operate the detachment unit for detaching the extraction unit from the extractable unit.

Preferably, the release unit operates the detachment unit and detaches the extraction unit from the extractable unit when the extractable unit has been pulled out of the cargo bay of the aerospace vehicle by the extraction unit.

In a preferred embodiment, the release unit is physically connected by a release line to the detachment unit. The detachment unit only detaches the extraction unit from the extractable unit if a load acting trough the release line onto the detachment unit exceeds a predetermined value.

It is preferred that for detaching the extraction unit from the extractable unit an actuator of the release unit tightens the release line until the load acting onto the detachment unit through the release line exceeds the predetermined value.

The release line preferably transfers a load from the detachment unit to the release unit such that when the extractable unit is pulled in an extraction direction by the extraction unit the release unit moves with the extractable unit along the guiding system in the extraction direction.

In a preferred embodiment the release unit is controlled to operate the detachment unit such that the extraction unit is detached from the extractable unit when the extractable unit has been pulled out of the cargo bay of the aerospace vehicle by the extraction unit by preventing further movement of the release unit along the extraction direction by the guiding system such that the load acting onto the detachment unit through the release line exceeds the predetermined value due to the continued movement of the extractable unit.

The detachment unit is preferably formed by a three-ring release system.

The method according to the present disclosure and its various preferred embodiments share the advantages of the respective embodiments of a system according to the present disclosure having similar features.

BRIEF DESCRIPTION OF THE DRAWINGS

In the following an exemplary embodiment of a system and a method according to the present disclosure will be described with reference to the Figures, wherein.

DETAILED DESCRIPTION

Figure 1:
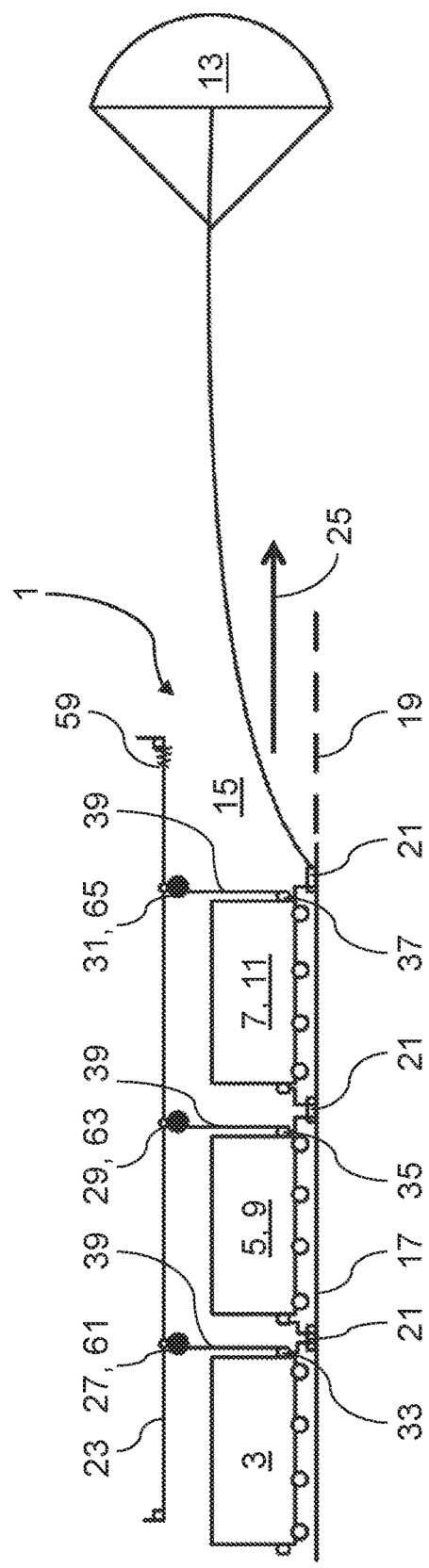
FIG. 1 shows a schematic drawing of an exemplary embodiment of a system according to the present disclosure.

FIG. 1 shows an exemplary embodiment of a system 1 for detaching an extractable unit 3, 5, 7 from an extraction unit 9, 11, 13. The system 1 shown in FIG. 1 is adapted to detach three different extractable units 3, 5, 7 from their respective extraction units 9, 11, 13. The extractable units 3, 5, 7 are 463 L compatibility ULDs which are arranged in a cargo bay 15 of an aerospace vehicle in form of a cargo aircraft (not shown). Of the cargo bay 15 only a floor 17 and a cargo ramp 19 in an opened position are shown. The extractable unit 7 is extracted by an extraction parachute 13 forming the respective extraction unit 13. The extraction unit 11 pulling the extractable unit 5 out of the cargo bay 15 is formed by the extractable unit 7 and the extraction unit 9 pulling the extractable unit 3 out of the cargo bay 15 is in turn formed by the extractable unit 5. In other words, the extractable units 5, 7 are at the same time extraction units 9, 11. Thus, when the extractable units 3, 5, 7 are supposed to be dropped from the cargo bay 15 only the extractable unit 7 is pulled out of the cargo bay 15 by an extraction parachute 13 whereas the remaining extractable units 3, 5 are pulled out of the cargo bay 15 by the respective preceding extractable units 5, 7.

The extraction units 9, 11, 13 are connected via so-called tow plates 21 with their respective extractable units 3, 5, 7. The tow plates 21 are provided to make sure that sufficiently high extraction forces are provided by the respective extraction units 9, 11, 13 before the extractable units are released.

The system 1 according to the present disclosure comprises a guiding system 23 formed by a rail 23 which is attached to a structure (not shown) of the fuselage of the cargo aircraft. The extractable units 3, 5, 7 are, thus, arranged between the floor 17 and the guiding system 23. The rail 23 extends in the cargo bay 15 in an extraction direction 25 in which the extractable units 3, 5, 7 are pulled by their respective extraction units 9, 11, 13 out of the cargo bay 15. The exemplary embodiment of a system 1 according to the present disclosure comprises three release units 27, 29, 31 which are movably attached to the guiding system 23. The guiding system 23 enables the release units 27, 29, 31 to slide along the guiding system 23 in the extraction and direction 25.

Each release unit 27, 29, 31 is physically connected to a respective detachment unit 33, 35, 37 via a release line 39. The detachment units 33, 35, 37 are formed by so-called three-ring release systems. An exemplary embodiment of a three-ring release system 41 will now be briefly described with reference to FIG. 2.

The three-ring release system 41 comprises a first strand or leash 43 which is provided for connection to an extraction unit and a second leash 45 for connection to an extractable unit. The extraction unit and the extractable unit are not shown in FIG. 2. A third leash 47 is attached to the second leash 45. To a free end of each leash 43, 45, 47 a loop or ring 49, 51, 53 has been attached. The size of the rings 49, 51, 53 has been chosen such that the ring 51 attached to the second leash 45 can be inserted through the ring 49 attached to the first leash 43 and the ring 53 attached to the third leash 47 can be inserted through the ring 51 attached to the second leash 45. Thus, the ring-and-leash combinations secure one another in sequence and provide a lever arrangement with each of the leashes 43, 45, 47 in the sequence from the first to the third leash 43, 45, 47 having to bear less load.

Figure 2:
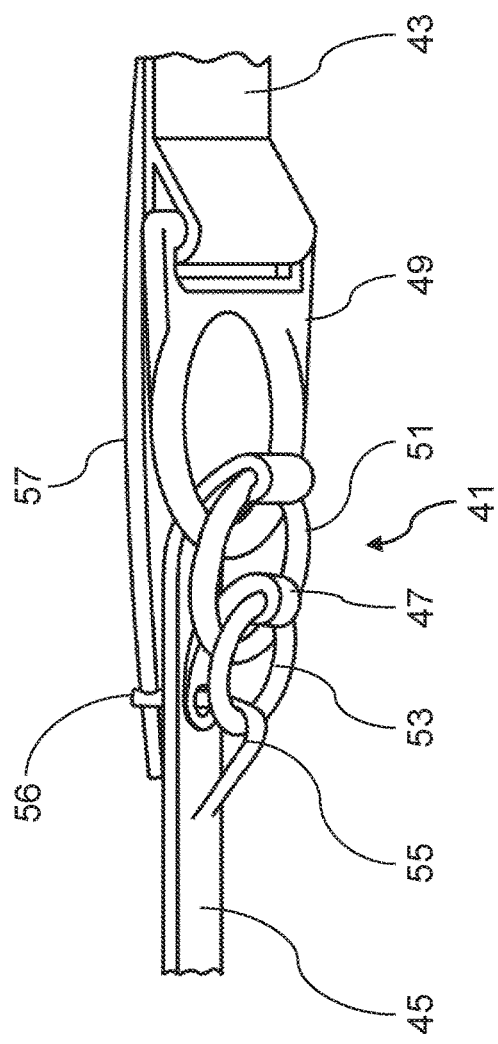
FIG. 2 shows an exemplary embodiment of a detachment unit used in the exemplary embodiment shown in FIG. 1.

Finally a string 55 is provided which has been inserted through the ring 53 attached to the third leash 47 and through the second leash 45, thus, securing the third ring 53. The string 55 forms a loop 56 at a free end through which a release element 57 has been inserted. If the release element 57 is removed from the loop 56, each of the rings 49, 51 will in sequence be pulled through the respective preceding ring 51, 53 and the connection between the first leash 43 and the second leash 45 will be detached or disconnected. Using a three-ring release system 41 as shown in FIG. 2 is preferred in the exemplary embodiment of a system 1 according to the present disclosure as detachment unit 33, 35, 37 as only little load is required to pull the release element 57 out of the loop 56 formed by the string 55 for detaching the first leash 43 from the second leash 45. It is evident to the skilled person that different embodiments of a three-ring releases system or completely different detachment units can also be used in the exemplary embodiment of a system 1 according to the present disclosure shown in FIG. 1.

In the system 1 shown in FIG. 1 the release lines 39 are connected to the release elements 57 of the respective detachment units 33, 35, 37. Each of the release units 27, 29, 31 comprises a respective actuator 61, 63, 65. The actuator is provided for tightening the respective release line 39 if controlled to do so. The actuators can, for example, be driven by an electric motor, by a hydraulic motor or by a spring-driven motor.

The further features of the system 1 will become apparent by the following description of an exemplary embodiment of a method according to the present disclosure for detaching an extractable unit from an extraction unit.

In the exemplary embodiment of a method according to the present disclosure the extractable units 3, 5, 7 are pulled out of the cargo bay 15 by their respective extraction units 9, 11, 13 in the extraction direction 25. As the release units 27, 29, 31 are connected through the release lines 39 to the respective detachment units 33, 35, 37, they move with the respective extractable units 3, 5, 7 in the extraction direction 25. When one of the extractable units 3, 5, 7 jams such that it cannot move further in the extraction direction 25, a loadmaster or operator of the cargo aircraft can instruct the respective release unit 27, 29, 31 to tighten the release line 39 connecting the release unit 27, 29, 31 to the detachment unit 33, 35, 37 until a predetermined load acting through the release line 39 onto the detachment unit 33, 35, 37 is exceeded and the detachment unit 33, 35, 37 detaches the extraction unit 9, 11, 13 from the extractable unit 3, 5, 7. In the exemplary embodiment shown in FIG. 1 actuators are provided in each of the release units 27, 29, 31 which pull the release lines 39 tight until the predetermined load is exceeded if controlled to do so by an operator. The exemplary embodiment of a system 1 according to the present disclosure, thus, advantageously allows disconnecting or detaching an extraction unit 9, 11, 13 from an extractable unit 3, 5, 7 throughout its way through the cargo bay 15 and not just in the vicinity of its initial position.

It should be pointed out that if a plurality of extractable units 3, 5, 7 is extracted from a cargo bay 15 of an aerospace vehicle and one of the extractable units 3, 5, 7 jams on its way out, using a system 1 according to the present disclosure only the extraction unit 9, 11, 13 directly pulling the jammed extractable unit 3, 5, 7 needs to be detached by a respective detachment unit 33, 35, 37. For example, if in the exemplary embodiment shown in FIG. 1 the first extraction unit 3 jams, the connection to the directly preceding extraction unit 9, i.e., the second extractable unit 5, can be selectively detached by an operator. Thus, the second and the third extractable unit 5, 7 can advantageously still be pulled out of the cargo bay 15 of the aerospace vehicle in a controlled manner.

If the extractable unit 3, 5, 7 does not jam on its way through the cargo bay 15 and reaches the cargo ramp 19, the release unit 27, 29, 31 eventually engages with a stop element 59 of the guiding system 23. The stop element 59 restricts further movement of the release unit 27, 29, 31 while the respective extractable unit 3, 5, 7 will continue to move in the extraction direction 25 out of the cargo bay 15. The load acting on the release line 39, thus, increases continuously until the predetermined load is exceeded and the detachment unit 33, 35, 37 detaches the extractable unit 3, 5, 7 from its respective extraction unit 9, 11, 13. Thus, the extractable or cargo units 3, 5, 7 can advantageously drop independently of one another from the aerospace vehicle to the ground.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for detaching extraction units from extractable units in aerial delivery, wherein each extractable unit is adapted to be pulled by a respective extraction unit in an extraction direction through and/or out of a cargo bay of an aerospace vehicle for aerial delivery, the system comprising:
a guiding system;
for each extractable unit, a release unit, a release line, and a detachment unit that is connectable to the extractable unit and that is operable for controllably detaching the extraction unit from the extractable unit; and
for each release unit, an actuator which is configured to tighten the release line if the respective extractable unit jams during extraction,
wherein the release unit is movably attached to the guiding system and is physically connected to the detachment unit such that the release unit is movable with the extractable unit in the extraction direction along the guiding system when the extractable unit is pulled by the extraction unit through and/or out of the cargo bay; and
wherein each actuator is selectively controllable to operate the detachment unit.

2. The system according to claim 1, wherein the release unit is configured to operate the detachment unit when the extractable unit to which the detachment unit has been connected has been pulled out of the cargo bay of the aerospace vehicle by the extraction unit.

3. The system according to claim 1, wherein the release unit is physically connected by the release line to the detachment unit, and
wherein the detachment unit is configured to only detach the extraction unit from the extractable unit if a load acting through the release line onto the detachment unit exceeds a predetermined value.

4. The system according to claim 3, wherein the actuator is configured to tighten the release line until the load acting through the release line exceeds the predetermined value for detaching the extraction unit from the extractable unit.

5. The system according to claim 3, wherein the release line is configured to transfer a load from the detachment unit to the release unit such that when the extractable unit is pulled in the extraction direction by the extraction unit the release unit moves with the extractable unit along the guiding system in the extraction direction.

6. The system according to claim 3, wherein the release unit is configured to operate the detachment unit when the extractable unit to which the detachment unit has been attached has been pulled out of the cargo bay,
wherein the detachment unit is operated by the release unit in that further movement of the release unit along the extraction direction is prevented by the guiding system such that the load acting onto the detachment unit through the release line exceeds the predetermined value due to a continued movement of the extractable unit.

7. The system according to claim 3, wherein the detachment unit is formed by a three-ring release system.

8. The system according to claim 1, wherein the guiding system is configured to be mounted in the cargo bay of the aerospace vehicle such that the extractable unit moving along a floor of the cargo bay in the extraction direction moves between the floor of the cargo bay and the guiding system.

9. The system according to claim 1, wherein the release unit for each extractable unit is selectively controllable by an operator.

10. The system according to claim 4, wherein the actuator comprises a motor.

11. A method for detaching an extraction unit from an extractable unit when the extraction unit pulls the extractable unit in an extraction direction through and/or out of a cargo bay of an aerospace vehicle for aerial delivery of a plurality of extractable units,
wherein, for each extractable unit, the extractable unit is connected to the extraction unit by a detachment unit,
wherein, for each extractable unit, a release unit physically connected to the detachment unit by a release line moves along a guiding system in the extraction direction with the extractable unit when the extractable unit is pulled by the extraction unit through and/or out of the cargo bay,
wherein each release unit comprises an actuator that is controllable to tighten the release line if the respective extractable unit jams during extraction.

12. The method according to claim 11, wherein the release unit operates the detachment unit and detaches the extraction unit from the extractable unit when the extractable unit has been pulled out of the cargo bay of the aerospace vehicle by the extraction unit.

13. The method according to claim 11,
wherein the detachment unit only detaches the extraction unit from the extractable unit if a load acting through the release line onto the detachment unit exceeds a predetermined value.

14. The method according to claim 13, wherein for detaching the extraction unit from the extractable unit, the actuator of the release unit tightens the release line until the load acting through the release line exceeds the predetermined value.

15. The method according to claim 13, wherein the release line transfers a load from the detachment unit to the release unit such that when the extractable unit is pulled in the extraction direction by the extraction unit, the release unit moves with the extractable unit along the guiding system in the extraction direction.

16. The method according to claim 13, wherein the release unit is controlled to operate the detachment unit such that the extraction unit is detached from the extractable unit when the extractable unit has been pulled out of the cargo bay of the aerospace vehicle by the extraction unit by preventing further movement of the release unit along the extraction direction by the guiding system such that the load acting onto the detachment unit through the release line exceeds the predetermined value due to the continued movement of the extractable unit.

17. The method according to claim 11, wherein the detachment unit is formed by a three-ring release system.

18. The method according to claim 11, wherein the release unit for each extractable unit is selectively controllable by an operator.

19. The method according to claim 14, wherein the actuator comprises a motor.

* * * * *